(No Model.)

D. S. PHILLIPS.
ANIMAL STALL.

No. 502,829. Patented Aug. 8, 1893.

Witnesses:
L. C. Hills
E. H. Bond

Inventor
Dunklin S. Phillips
By E. B. Stocking
Attorney

UNITED STATES PATENT OFFICE.

DUNKLIN S. PHILLIPS, OF FLORENCE, ALABAMA.

ANIMAL-STALL.

SPECIFICATION forming part of Letters Patent No. 502,829, dated August 8, 1893.

Application filed May 12, 1893. Serial No. 473,985. (No model.)

*To all whom it may concern:*

Be it known that I, DUNKLIN S. PHILLIPS, a citizen of the United States, residing at Florence, in the county of Lauderdale and State of Alabama, have invented certain new and useful Improvements in Stalls, of which the following is a specification, reference being had therein to the accompanying drawings.

This invention relates to certain new and useful improvements in stalls and it has for its objects among others to provide a simple and cheaply constructed stall in which a cow can be milked with ease and safety to the milker, and it consists essentially in a stall having upon one side a hinged door or gate through which the animal can make its exit, while upon the other side is a door or gate to provide for the ingress of the animal and provided with a hinged portion closing an opening through which the milker places his hands to milk the cow. This last-mentioned door or gate is designed to be pushed inward to crowd the animal against the opposite side of the stall and thus hold the animal against movement while being milked. A board is provided to prevent a backward movement of the animal. The back door or gate is arranged to be operated from the front of the stall, and upon the front wall of the stall I provide a closet with shelves for the reception of the milk receptacles. The stall may be used for other purposes than simply milking; it may be used for the holding of animals while they are being marked or castrated, or for taming or handling them.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1:
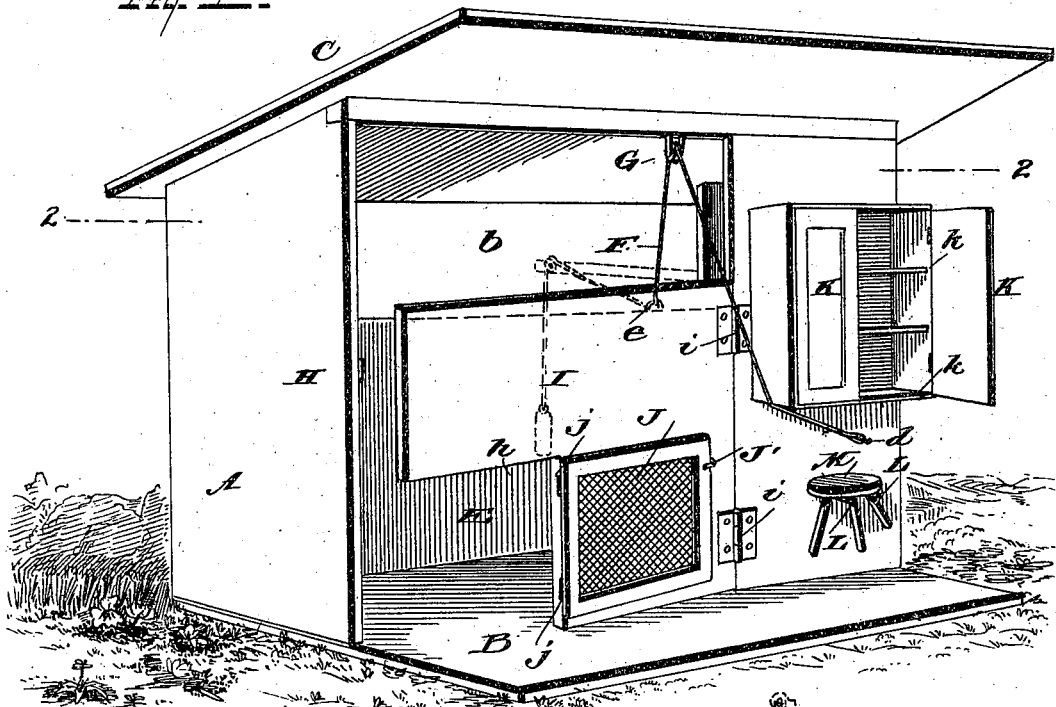
Figure 2:
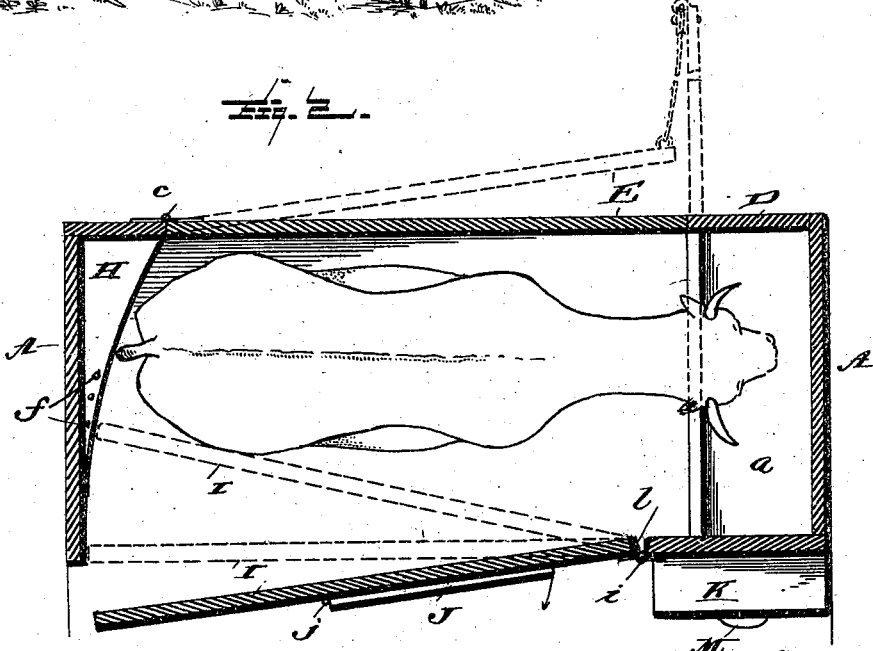

Figure 1 is a perspective view of my improved stall with the front gate or door partly open. Fig. 2 is a horizontal section on the line 2—2 of Fig. 1, looking down.

Like letters of reference indicate like parts in both of the views.

Referring now to the details of the drawings by letter, A designates the end walls, B the floor, C the roof and D the rear wall of my stall. At one end within the stall is provided a feed box $a$ extending from the front to the rear wall of the stall, and which may be of any desired form of construction. The rear wall has an opening $b$, the greater portion of which is closed by a door E hung upon suitable hinges $c$ to swing outward as shown by dotted lines in Fig. 2.

F is a cord or chain attached at one end to the rear gate or door E as shown at $e$ and after passing over a pulley G suspended from the top of the stall near the front, is extended downward as seen in Fig. 1 and its end is designed to be engaged over a suitable hook or catch or other device $d$ for holding the door closed.

At the end of the stall opposite that at which the feed-box is located there is arranged a transverse curved bar or strip H which tapers or curves from the front toward the rear as shown in Fig. 2 and serves to prevent backward movement of the animal when in the stall and also to engage the end of the front door to hold the same in its innermost position as will be understood from Fig. 2. Pegs or nails $f$ may be inserted in the strip H as seen in Fig. 2 to which or over which the tail of the animal may be held or secured while milking.

I is the front door or gate; it is hinged upon suitable hinges $i$ at the end opposite that at which the rear door or gate is hinged so as to swing in opposite directions as shown best in Fig. 2, and this door or gate may extend a greater or less distance vertically, preferably leaving a space above for ventilation as shown in Fig. 1. Near its free end, which is that nearest the rear end of the stall, it has a portion cut away upon the lower edge leaving an opening or space $h$ in which the milker sits or through which he may pass his hands to milk the cow. This space may at all times remain open or it may be closed at such times as the stall is not in use by a gauze door J hinged upon suitable hinges $j$ at one side as shown in Fig. 1.

Upon the front wall of the stall beyond the hinges of the door I, I arrange a closet K having shelves $k$ for the reception of the milk pans, and beneath the same I place a suitable support L for the milking stool M, as shown in Fig. 1. The door J may be held open by any suitable means as a catch J', as seen in Fig. 1. The edge of the door I and the adjacent edge of the front wall to which it is hinged are beveled as seen in Fig. 2 at *l* to allow the door to swing inward as indicated by dotted lines in said figure.

In practice the rear door is closed and held closed by the cord or chain being engaged with its catch or hook as shown in Fig. 1, and the front door is opened and the animal driven into the stall. The front door is then closed and pushed in so as to crowd the animal over against the rear wall to prevent any material movement of the animal; the screen door is then opened and the milker places his stool at or through the opening *h* when he can proceed to milk without disturbance or danger of being kicked by the cow. When he is through milking the rear door may be opened and the cow let out that way or through the front door as may be desired. The stall may be used for other purposes with equally as good results, as for instance marking or castrating animals, or for taming or training them. Of course the floor may be omitted and the walls supported in the ground, but I prefer a floor.

What I claim as new is—

1. A stall having a curved tapered transverse strip at one end provided with pins and a hinged door, as and for the purpose specified.

2. The stall described having a rear door hinged at one end, a front door hinged at the opposite end and having a smaller door hinged thereto to close a space at its lower corner, a cord connected with the rear door and extended to the front over a pulley, with a space above both of said doors, all substantially as shown and described.

In testimony whereof I affix my signature in presence of two witnesses.

DUNKLIN S. PHILLIPS.

Witnesses:
GEO. H. PORTER,
J. L. MCCLURE.